(12) United States Patent
Kim et al.

(10) Patent No.: US 7,031,107 B2
(45) Date of Patent: Apr. 18, 2006

(54) MAGNETIC HEAD PARKING SYSTEM OF HARD DISK DRIVE

(75) Inventors: Do-wan Kim, Suwon-si (KR); Woo-cheol Jeong, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 52 days.

(21) Appl. No.: 10/618,630

(22) Filed: Jul. 15, 2003

(65) Prior Publication Data

US 2004/0012885 A1 Jan. 22, 2004

(30) Foreign Application Priority Data

Jul. 18, 2002 (KR) .............................. 2002-41990

(51) Int. Cl.
*G11B 17/02* (2006.01)

(52) U.S. Cl. ..................................... 360/99.08; 360/128

(58) Field of Classification Search ................ 360/129, 360/254.6, 255, 99.08, 99.04, 98.07, 97.01, 360/254.8, 128
See application file for complete search history.

(56) References Cited

U.S. PATENT DOCUMENTS

| | | | | |
|---|---|---|---|---|
| 5,640,290 A | * | 6/1997 | Khanna et al. | 360/97.01 |
| 6,373,666 B1 | * | 4/2002 | Iida et al. | 360/254.7 |
| 6,473,270 B1 | * | 10/2002 | McDonald et al. | 360/265.1 |

* cited by examiner

*Primary Examiner*—Robert S. Tupper
(74) *Attorney, Agent, or Firm*—Stass & Halsey, LLP

(57) ABSTRACT

A magnetic head parking system of a hard disk drive to move a magnetic head mounted on a slider of an actuator from a data zone of a disk and to place the magnetic head in a parking zone thereof when the disk stops rotating. The magnetic head parking system includes a head limiter provided on an upper surface of a flange of a spindle motor to protrude toward the disk and restricting a range of movement in upward and downward directions of the magnetic head placed in the parking zone of the disk. The head limiter is provided at a position opposite to a position where the slider of the actuator is installed or at a position deviating from and/or adjacent to a position directly under the slider. Thus, when an external impact is applied and an operation of the hard disk drive is stopped, the range of the up and down movement of the magnetic head is limited by the head limiter, so that the possibility of the damage to the magnetic head due to the head slap can be lowered.

30 Claims, 7 Drawing Sheets

US 7,031,107 B2

MAGNETIC HEAD PARKING SYSTEM OF HARD DISK DRIVE

CROSS-REFERENCE TO RELATED APPLICATION

This application claims the priority of Korean Patent Application No. 2002-41990 filed Jul. 18, 2002 in the Korean Intellectual Property Office, the disclosure of which is incorporated herein by reference.

BACKGROUND OF THE INVENTION

1. Field of the Invention

The present invention relates to a hard disk drive, and more particularly, to a magnetic head parking system of a hard disk drive which enables stable parking of a magnetic head when an operation of the hard disk drive is stopped.

2. Description of the Related Art

A hard disk drive (HDD) is an auxiliary memory device of a computer which reproduces data stored on a magnetic disk or records data on the magnetic disk by using a magnetic head.

FIG. 1 is a plan view illustrating a conventional hard disk drive. FIG. 2 is a partial perspective view illustrating part of a conventional magnetic head parking system. FIG. 3 is a perspective view illustrating a portion A shown in FIG. 2.

Referring to FIGS. 1 and 2, a hard disk drive includes a magnetic disk (i.e., hard disk) 20 which is a recording medium to record data, a spindle motor 30 installed on a base plate 10 and rotating the magnetic disk 20, an actuator 40 having a magnetic head 41 to record the data on the magnetic disk 20 and to reproduce the data stored on the magnetic disk 20.

Typically, one or a plurality of the magnetic disks 20 are installed in the hard disk drive and separated a predetermined distance from each other and are rotatable by the spindle motor 30. A parking zone 21, where a slider 42, on which the magnetic head 41 is mounted, is placed when power is turned off, is provided at an inner circumferential side of the magnetic disk 20. A data zone 22, where a magnetic signal is recorded, is provided outside the parking zone 21.

The actuator 40 is rotatable by a voice coil motor 48 around a pivot shaft 47 installed on the base plate 10. The actuator 40 includes an arm 46 pivotably coupled to the pivot shaft 47, the slider 42 where the magnetic head 41 is mounted, and a suspension 44 installed at the arm 46 to support the slider 42 to elastically bias the slider toward a surface of the magnetic disk 20.

In the conventional hard disk drive having the above structure, during data recording/reproduction operations, a lifting force by a rotation of the magnetic disk 20 and an elastic force by the suspension 44 are applied to the slider 42 on which the magnetic head 41 is mounted. Accordingly, the slider 42 is maintained in a lifted state above the data zone 22 of the magnetic disk 20 at a height where the lifting force and the elastic force are balanced. Thus, the magnetic head 41 mounted on the slider 42 maintains a predetermined distance from the magnetic disk 20 while performing data recording and reproduction with respect to the magnetic disk 20. Further, when the power is turned off and the rotation of the magnetic disk 20 stops, the lifting force lifting the slider 42 stops. Thus, before the lifting force stops, the slider 42 should be moved from the data zone 22 of the magnetic disk 20 so that possible damage to the data zone 22 due to a contact between the slider 42 and the data zone 22 is preventable. Thus, when the arm 46 of the actuator 40 rotates to move the slider 42 to the parking zone 21 of the magnetic disk 20 before the magnetic disk 20 completely stops rotating, the slider 42 being placed in the parking zone 21, the damage to the data zone 22 is preventable.

When the power is turned on and the magnetic disk 20 resumes rotating, the lifting force is generated again and accordingly the slider 42 is lifted. The slider 42 in the lifted state is moved to the data zone 22 of the magnetic disk 20 by pivoting of the arm 46. The magnetic head 41 mounted on the slider 42 performs recording and reproduction of the data with respect to the data zone 22 of the magnetic disk 20.

Recently, as shown in FIG. 3, to facilitate lifting of the slider 42 by reducing a contact area between the slider 42 and the parking zone 21 of the magnetic disk 20, bumpers 21a of crater-like shapes may be formed by a laser on the parking zone 21.

The above magnetic head parking system is referred to as a contact start stop (CSS) type magnetic head parking system.

A locking apparatus 50 may be provided to prevent a movement of the actuator 40 after the slider 42 is placed in the parking zone 21 of the magnetic disk 20. The locking apparatus 50 prevents the actuator 40 from unnecessarily pivoting by an external impact when the power is turned off. Thus, the data zone 22 can be prevented from being damaged due to the external impact by the magnetic head 41 directly contacting the data zone 22 since the slider 42 is prevented from moving from the parking zone 21 to the data zone 22 by the locking apparatus 50.

However, in the above CSS type magnetic head parking system, the suspension 44 and the slider 42 may be severely vibrated in upward and downward directions by the external impact when the power is turned off. In this case, the magnetic head 41 collides against a surface of the parking zone 21 of the magnetic disk 20 and is damaged. The locking apparatus 50 can only prevent the actuator 40 from pivoting due to an external impact, but does not prevent the movement in the upward and downward directions of the slider 42. Damage to the magnetic head 41 is frequently generated in the magnetic head parking system having the above structure.

Problems of the conventional magnetic head parking system will be described below with reference to FIG. 4. Referring to the FIG. 4, the parking zone 21 and the data zone 22 are provided at a lower surface of the magnetic disk 20. The suspension 44 and the slider 42 of the actuator 40 are disposed between the base plate 10 and the magnetic disk 20. The spindle motor 30 is installed on the base plate 10 by a flange 32. A hub 36 is rotatably installed at an outer circumference of a shaft 34 of the spindle motor 30 by providing a bearing 38 to interpose between the shaft 34 and the hub 36. The magnetic disk 20 is inserted around an outer circumference of the hub 36. A disk clamp 60 to fix the magnetic disk 20 to the hub 36 of the spindle motor 30 is coupled to an upper end portion of the spindle motor 30 by a screw 62.

In the above structure, when an external impact is applied to the hard disk drive in the state in which the magnetic head 41 is parked in the parking zone 21 of the disk 20, the suspension 44 and the slider 42 moves severely in the upward and downward directions so that a head slap phenomenon, in which the magnetic head 41 mounted on the slider 42 collides against the surface of the magnetic disk 20, is generated. Thus, when the external impact is applied to the hard disk drive in the state in which the operation of the hard disk drive stops, the suspension 44 which is flexible and elastic and the slider 42 installed at an end portion of the suspension 44 are severely moved in the upward and downward directions. Since the slider 42 is disposed between the magnetic disk 20 and the flange 32 of the spindle motor 30, a range of movement of the slider 42 is limited to a space between the magnetic disk 20 and the flange 32. As the movement range increases, the slider 42 is bounced so that an amount of an impact applied to the magnetic head 41 to collide against the surface of the magnetic disk 20 increases accordingly. In the conventional hard disk drive, an interval between the magnetic disk 20 and the flange 32 is rather large to facilitate a smooth pivot of the actuator 40 and to prevent interference thereof so that the movement range, in which the slider 42 is movable in the upward and downward directions, is considerably large. As a result, when a head slap is generated, the magnetic head 41 is easily damageable and the data recording/reproducing performance of the magnetic head 41 is lowered.

SUMMARY OF THE INVENTION

To solve the above and/or other problems, it is an aspect of the present invention to provide a magnetic head parking system of a hard disk drive which lowers a possibility of damage to a magnetic head due to a head slap by reducing a movement range of the magnetic head in upward and downward directions when an external impact is applied in a state in which an operation of the hard disk drive stops.

According to an aspect, a magnetic head parking system of a hard disk drive to move a magnetic head mounted on a slider of an actuator to move from a data zone of a magnetic disk and to be placed in a parking zone of the magnetic disk when the magnetic disk stops rotating, the magnetic head parking system comprising a head limiter provided on an upper surface of a flange of a spindle motor to protrude toward the magnetic disk and restricting a range of movement in upward and downward directions of the magnetic head placed in the parking zone of the magnetic disk.

The head limiter is provided at a position opposite to a portion where the slider of the actuator is installed. The head limiter is provided at a position deviating from and/or adjacent to a portion directly under the slider. The head limiter is formed larger in a width thereof than a width of a suspension of the actuator.

When the magnetic head lands on a surface of the magnetic disk, an interval between the head limiter and the suspension is in a range of about 0.3 to 0.6 mm. An upper surface of the head limiter is a curved surface. The head limiter is formed integrally with a flange.

A buffer member is attached to an upper surface of the head limiter. The head limiter is made of a material having a buffering ability and installed on the upper surface of the flange.

BRIEF DESCRIPTION OF THE DRAWINGS

These and/or other aspects and advantages of the invention will become apparent and more readily appreciated from the following description of the embodiment, taken in conjunction with the accompanying drawings of which.

DETAILED DESCRIPTION OF THE EMBODIMENT

Figure 1:
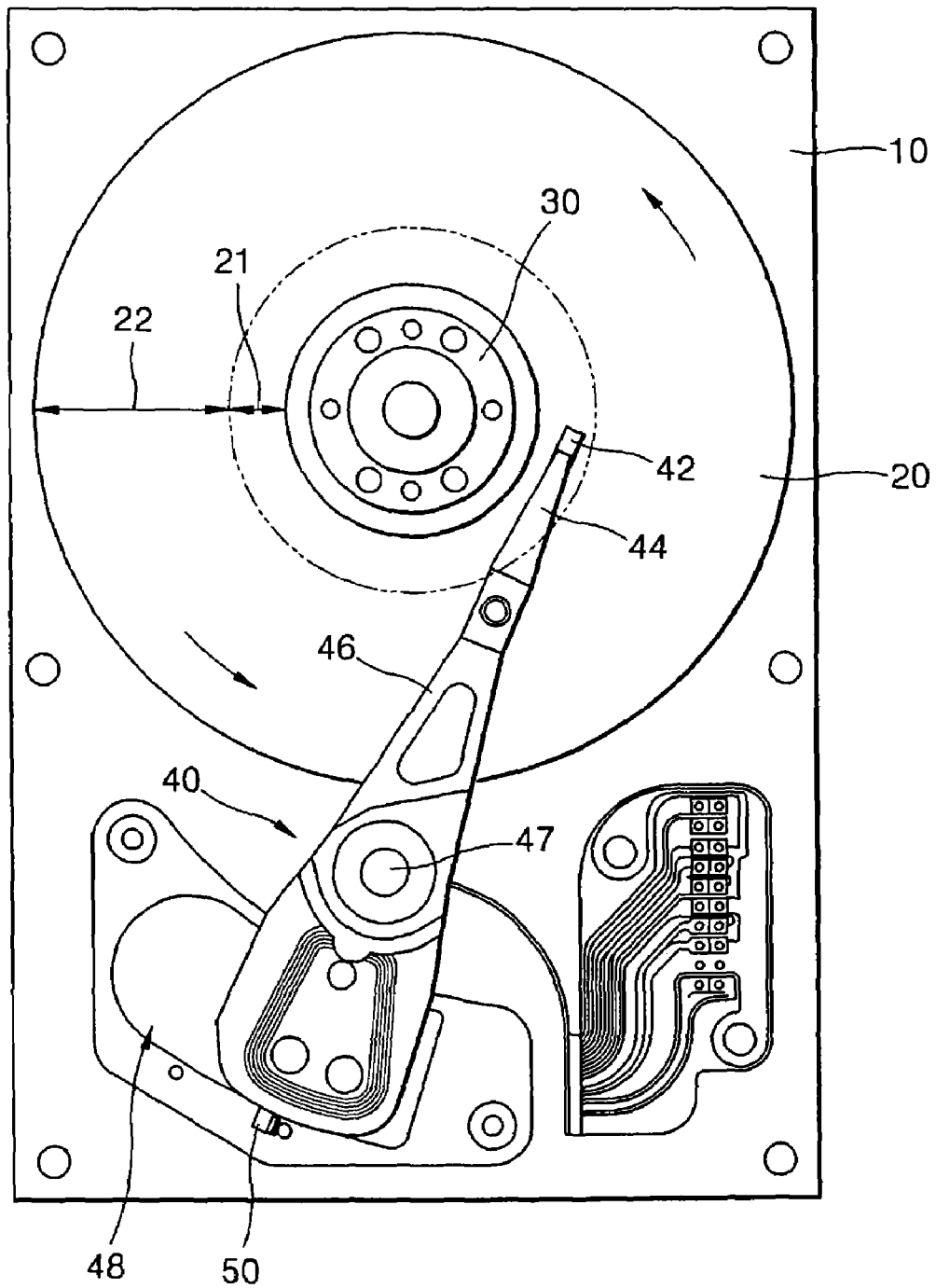
FIG. 1 is a plan view illustrating a conventional hard disk drive.
Figure 2:
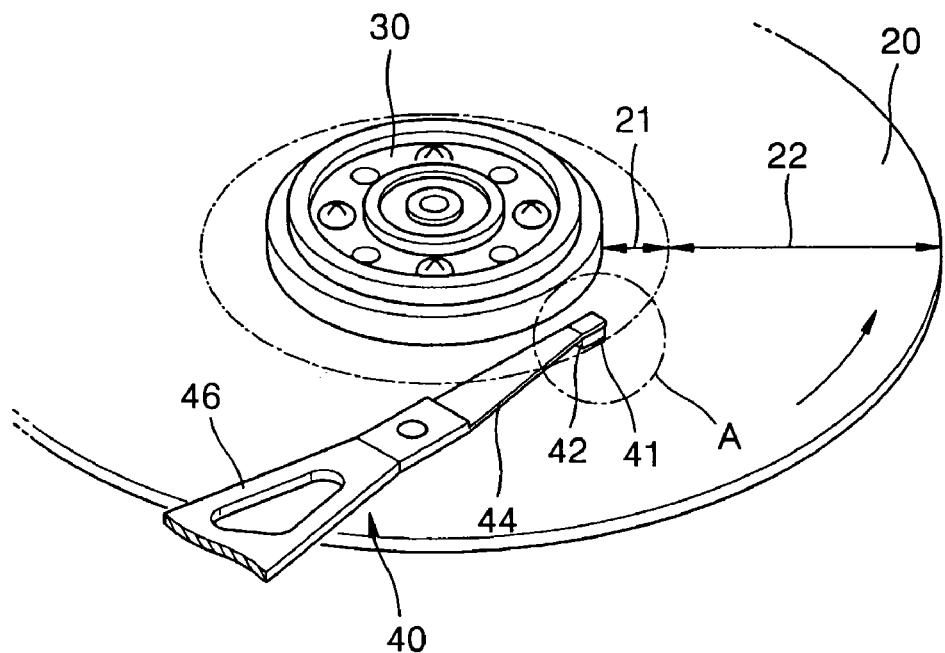
FIG. 2 is a partial perspective view illustrating part of a conventional magnetic head parking system.
Figure 3:
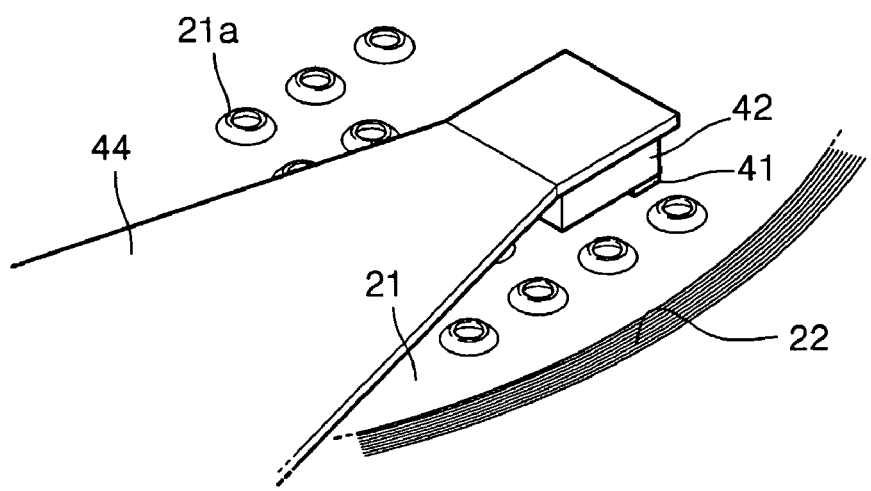
FIG. 3 is a perspective view illustrating portion A of FIG. 2.
Figure 4:
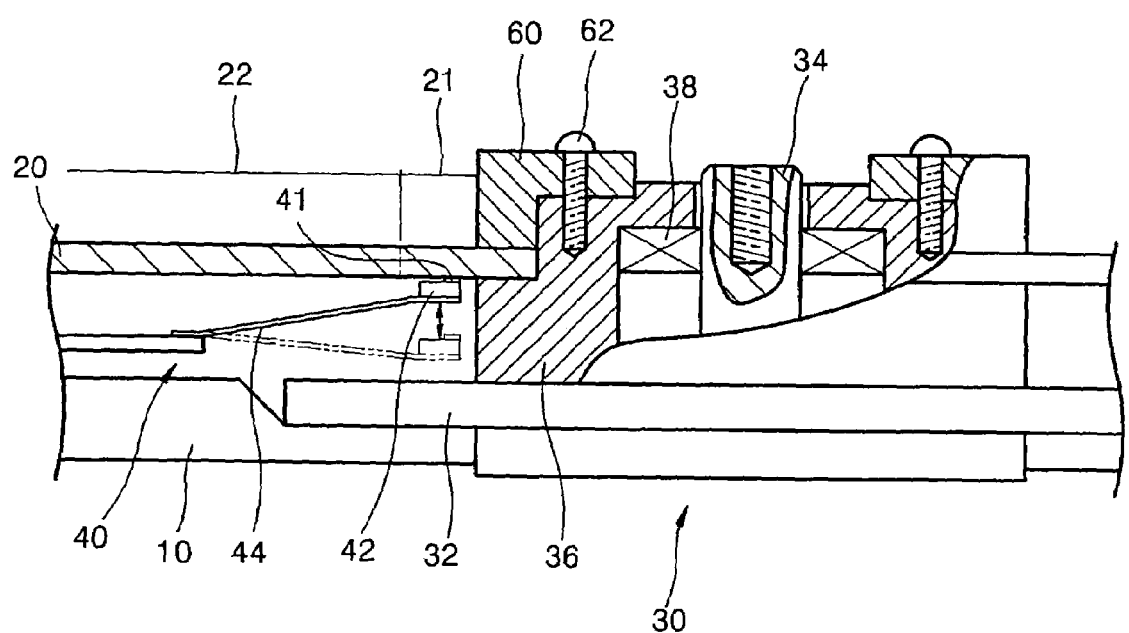
FIG. 4 is a sectional view explaining problems of the conventional magnetic head parking system.

Reference will now made in detail to the present embodiment of the present invention, examples of which are illustrated in the accompanying drawings, wherein like reference numerals refer to the like elements throughout. The embodiment is described below in order to explain the present invention by referring to the figures.

Figure 5:
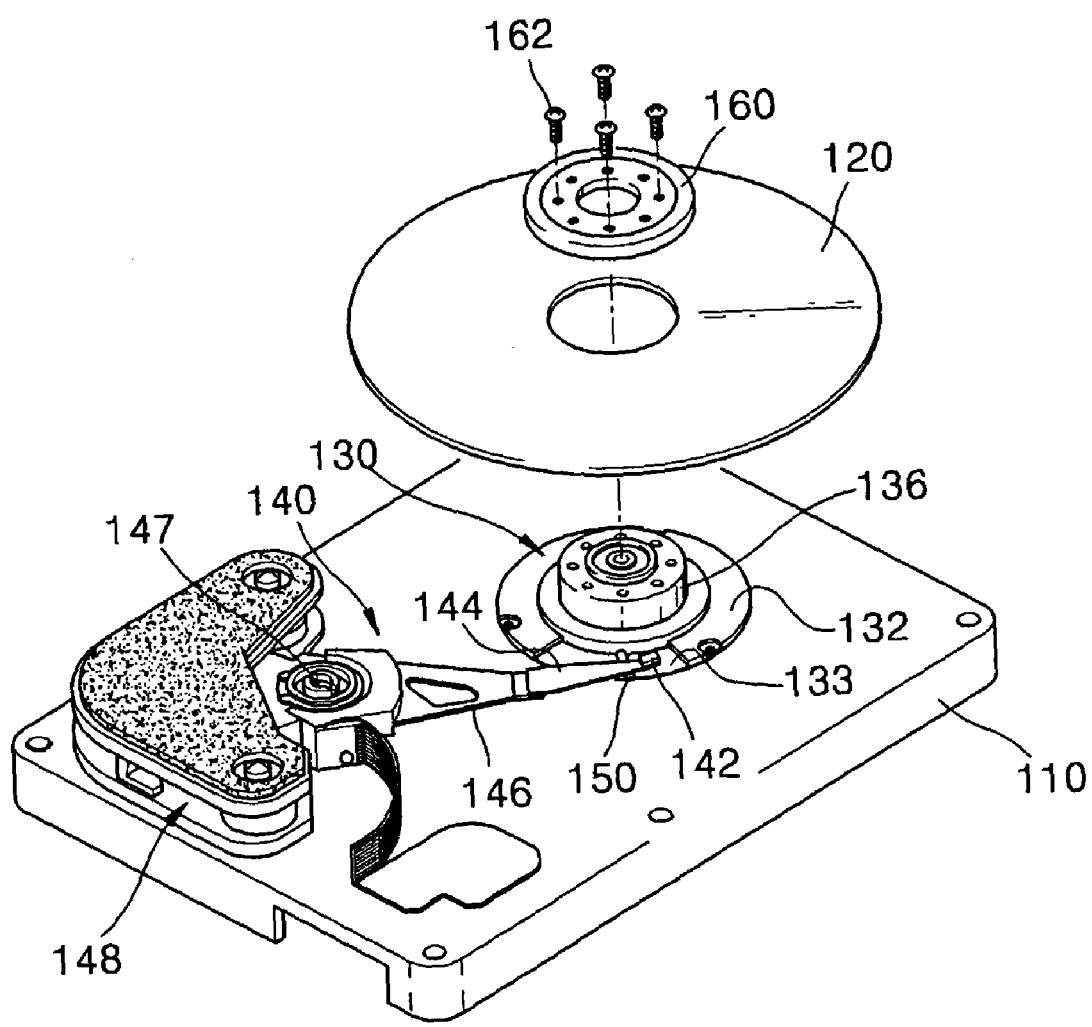
FIG. 5 is an exploded perspective view illustrating a hard disk drive having a magnetic head parking system according to an embodiment of the present invention.

Referring to FIG. 5, a hard disk drive includes a magnetic disk 120 to store data, a spindle motor 130, and an actuator 140. A magnetic head parking system according to an embodiment of the present invention is provided in the hard disk drive.

The magnetic disk 120, where data is stored, is rotatable by the spindle motor 130. The magnetic disk 120 is installed at an outer circumference of a hub 136 of the spindle motor 130 and is fixed to rotate together with the hub 136 without escaping from the hub 136 by a disk clamp 160 coupled to an upper end portion of the hub 136 by plural screws 162. Three or more magnetic disks may be installed in a hard disk drive to increase a data storage capacity. However, as a surface recording density of a magnetic disk increases, one or two magnetic disks are sufficient to store a significant amount of data. Thus, as shown in FIG. 5, the hard disk drive having a single magnetic disk is widely used. A magnetic head parking system according to the embodiment of the present invention is adoptable in not only a hard disk drive having a single magnetic disk but also in a hard disk drive having two or more magnetic disks.

The spindle motor 130 to rotate the magnetic disk 120 is installed on a base plate 110 via a flange 132. The actuator 140 to record and to reproduce data with respect to the magnetic disk 120 is pivotably installed on the base plate 110. The actuator 140 includes an arm 146 pivotably coupled to a pivot shaft 147 and a suspension 144 installed at the arm 146 to support a slider 142 on which a magnetic head 141 (see FIG. 6) is mounted to elastically bias the suspension 144 toward a surface of the magnetic disk 120. A voice coil motor 148 provides a driving force to pivot the actuator 140.

The magnetic head parking system makes the magnetic head 141 mounted on the slider 142 of the actuator 140 safely park away from a recording surface of the magnetic disk 120 when the magnetic disk 120 stops rotating, and includes a head limiter 150 provided on an upper surface of the flange 132 of the spindle motor 130.

Figure 6:
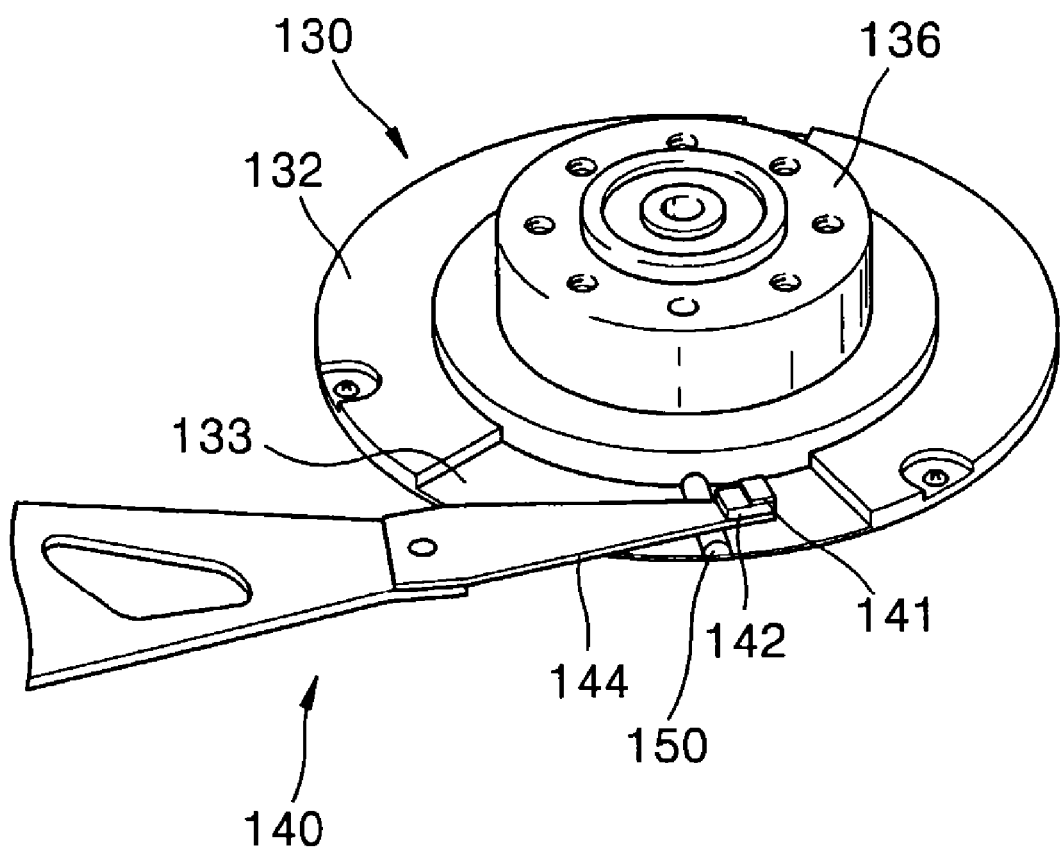
FIGS. 6 and 7 are a perspective view and a sectional view illustrating part of the magnetic head parking system of FIG. 5.
Figure 7:
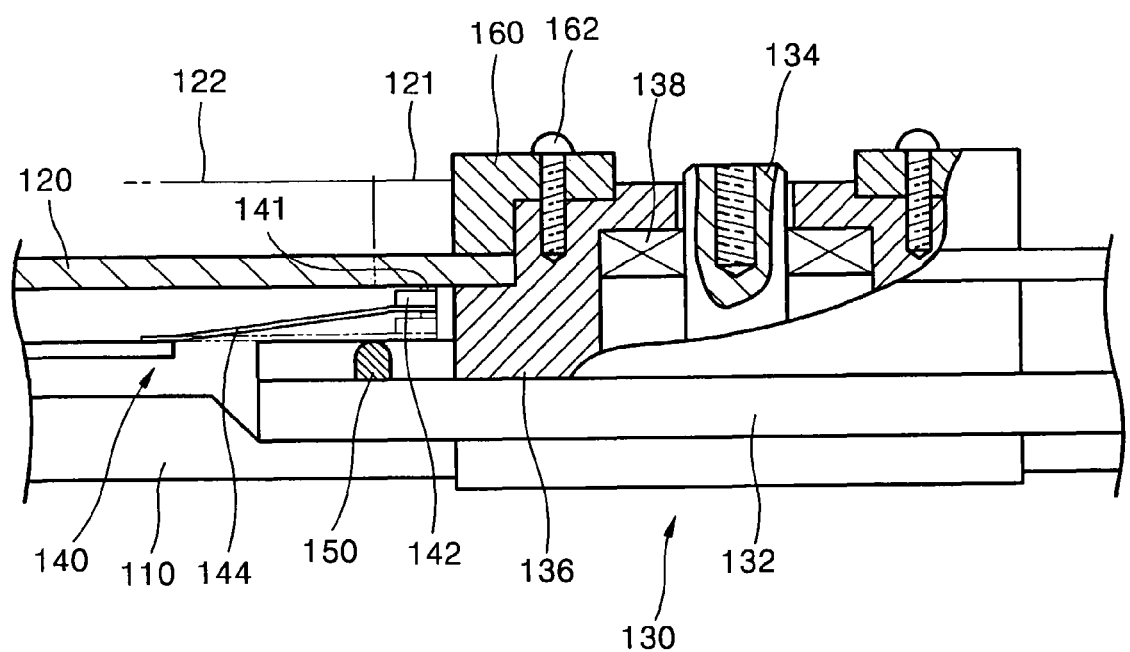

FIGS. 6 and 7 show a magnetic head parking system according to the embodiment of the present invention. Referring to FIGS. 6 and 7, the magnetic disk 120 is installed at the outer circumference of the hub 136 of the spindle motor 130 and fixed by the disk clamp 160 coupled to the upper end portion of the hub 136 by the plural screw 162. The hub 136 is rotatably installed at an outer circumference of a shaft 134 of the spindle motor 130 by typically interposing a bearing 138 between the shaft 134 and the hub 136. To prevent interference with the actuator 140 which is pivotable, a stepped surface 133 is formable on an upper surface of the flange 132 of the spindle motor 130 such that an upper surface of the stepped surface 133 is formed lower than an upper surface of another portion of the flange 132.

A parking zone 121, where the slider 142, on which the magnetic head 141 is mounted, is placed, when the power is turned off, is provided at an inner circumferential side of the magnetic disk 120. A data zone 122, where a magnetic signal is recorded, is provided outside the parking zone 121. In a state in which the magnetic head 141 is parked in the parking zone 121 of the disk 120, the slider 142, the magnetic head 141, and part of the suspension 144 of the actuator 140 are disposed between the parking zone 121 of the magnetic disk 120 and the flange 132 of the spindle motor 130.

A head limiter 150 is provided on the upper surface of the flange 132 of the spindle motor 130 to protrude toward the magnetic disk 120 to a predetermined height. The head limiter 150 restricts a range of movement in upward and downward directions of the magnetic head 141 placed between the parking zone 121 of the magnetic disk 120 and the flange 132 of the spindle motor 130. When the stepped surface 133 is formed on the flange 132 as described above, the head limiter 150 is disposed on the stepped surface 133.

The interval between the head limiter 150 and the suspension 144 may be in a range between 0.3–0.6 mm in a state in which the magnetic head 141 lands on a surface of the parking zone 121 of the magnetic disk 120 and, in particular, the interval may be in a range between 0.4–0.5 mm. If the interval is too small, the suspension 144 during pivoting is likely to interfere with the head limiter 150. If the interval is too large, the head limiter 150 does not work sufficiently.

The head limiter 150 may be placed under the suspension 144, that is, at any position opposite to a portion where the slider 142 is installed. The head limiter 150 directly restricts the range of movement in the upward and downward directions of the suspension 144. Accordingly, the up and down movements of the slider 142 and the magnetic head 141 located at the end portion of the suspension 144 is limited within a predetermined range. In particular, the head limiter 150 may be provided at a position adjacent from a position directly under the slider 142 installed at the end portion of the suspension 144, which avoids direct transfer of an impact to the magnetic head 141 mounted on the slider 142 when the suspension 144 moves in the downward direction to collide against the head limiter 150. Since the impact generated by the suspension 144 colliding against the head limiter 150 is buffered by the suspension 144, which is elastic, an amount of impact transferred to the magnetic head 141 is reducible. However, when the head limiter 150 is provided at a position deviating from and/or adjacent to the end portion directly under the slider 142, the head limiter 150 may be provided at a position as near as possible to (i.e. adjacent to) the slider 142. If the head limiter 150 is located far from the position directly under the slider 142, the up and down movements of the slider 142 and the magnetic head 141 cannot be effectively controlled. That is, due to an elasticity of the suspension 144, the range of movement in the upward and downward directions of the slider 142 installed at the end portion of the suspension 144 may be greater than that at a position where the head limiter 150 is provided.

Further, the head limiter 150 may be formed larger in a width thereof than that of the suspension 144. An entire width of the suspension 144 is contactable with the head limiter 150 at a contact portion between the suspension 144 and the head limiter 150. Thus, a phenomenon that an impact concentrates on one portion of the suspension 144 when the suspension 144 collides against the head limiter 150 is preventable. Further, when the suspension 144 collides against the head limiter 150 at an angle, the suspension 144 may twist due to repeated collision between the suspension 144 and the head limiter 150. However, since the suspension 144 contacts the head limiter 150 in a widthwise direction, that is, at a right angle with respect to a lengthwise direction of the suspension 144, the twist of the suspension 144 is preventable in advance.

The upper surface of the head limiter 150 may be formed of a curved surface. When the upper surface of the head limiter 150 is flat, an edge exists so that the suspension 144 may be bent or damaged by repeatedly colliding against the edge. Further, the head limiter 150 may be formed integrally with the flange 132 of the spindle motor 130. Thus, an addition step of manufacturing an additional member for the head limiter 150 and assembling the additional member to the flange 132 of the spindle motor 130 is not required.

In the operation of the magnetic head parking system having the above structure according to the present invention, during which data recording/reproduction is performed, the slider 142 on which the magnetic head 141 is mounted, is lifted from the data zone 122 of the magnetic disk 120 at a height where a lifting force by a rotation of the magnetic disk 120 and an elastic force by the suspension 144 are balanced.

When the power of the hard disk drive is turned off, the actuator 140 pivots to move the slider 142 to the parking zone 121 of the magnetic disk 120 before the lifting force to lift the slider 142 stops, that is, before the rotation of the magnetic disk 120 is completely stopped. As the lifting force is stopped, the slider 142 and the magnetic head 141 moved to the parking zone 121 of the magnetic disk 120 land on the surface of the parking zone 121 by the elastic force of the suspension 144. Further, the slider 142, the magnetic head 141, and part of the suspension 144 of the actuator 140 are disposed between the parking zone 121 of the magnetic disk 120 and the flange 132 of the spindle motor 130.

Further, in the state in which the rotation of the disk 120 is stopped, when an external impact is applied to the hard disk drive, since the suspension 144, which is flexible and elastic, and the slider 142 installed at the end portion of the suspension 144 move up and down, a head slap, in which the magnetic head 141 collides against the surface of the magnetic disk 120 is generated. The range of movement in the upward and downward directions of the magnetic head 141 mounted on the slider 142 is limited by the head limiter 150. When the range of movement in the upward and downward directions of the magnetic head 141 is substantially reduced compared to the conventional art, the amount of impact applied to the magnetic head 141, when the magnetic head 141 collides against the surface of the magnetic disk 120, is remarkably reduced and, thus, a possibility of damage to the magnetic head 141 due to the head slap is lowered.

Figure 8:
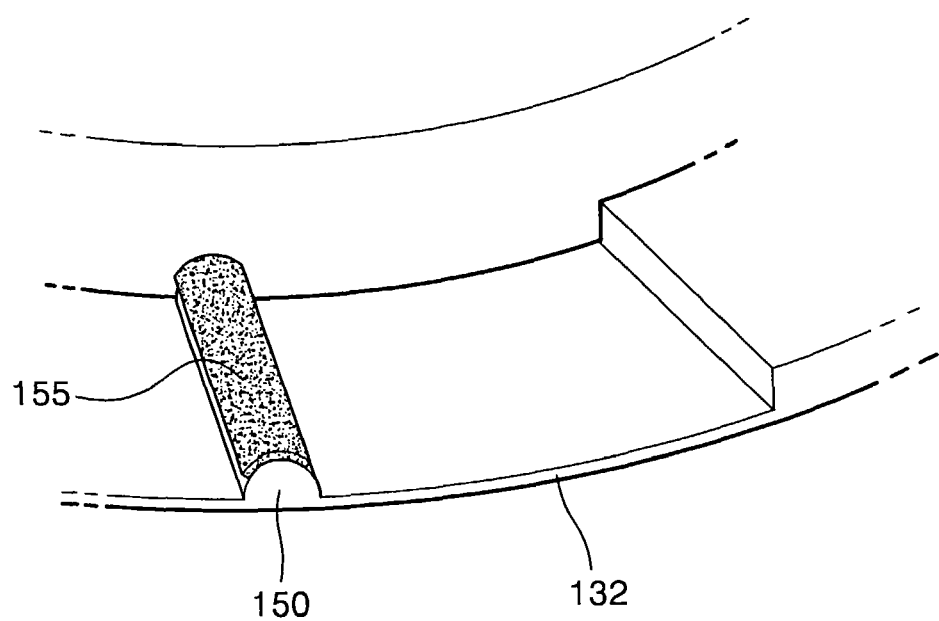
FIG. 8 is a perspective view illustrating a first example of a head limiter according to the embodiment of the present invention.
Figure 9:
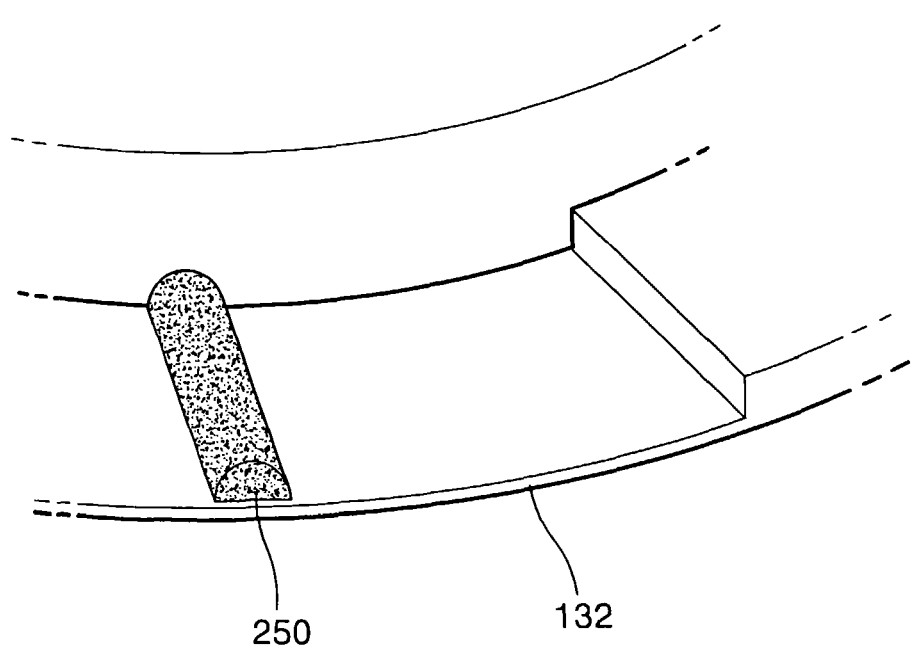
FIG. 9 is a perspective view illustrating a second example of the head limiter according to the embodiment of the present invention.

FIGS. 8 and 9 show examples of the head limiter of the magnetic head parking system according to the embodiment of the present invention. Referring to FIG. 8, a buffer member 155 having a predetermined thickness can be attached to an upper surface of the head limiter 150 protruding from the upper surface of the flange 132. The buffer member 155 may be made of rubber or synthetic resin having a buffering ability. The buffer member 155 may be attached to the upper surface of the head limiter 150 by using a predetermined adhesive or mechanically coupled thereto by using a screw. Thus, when the suspension 144 and the slider 142 move in the upward and downward directions by the external impact, the buffer member 155 absorbs part of the amount of impact so that the amount of the impact applied to the surface of the disk 120 is lower. Furthermore, the possibility of the damage to the magnetic head due to the head slap is further lowered.

Next, referring to FIG. 9, a head limiter 250 may be entirely made of rubber or synthetic resin having a buffering ability. That is, the buffer member 250 made of a material having a buffering ability and a profile of a convex shape may be installed on a flat upper surface of the flange 132. The head limiter 250 can be attached to the upper surface of the flange 132 by using a predetermined adhesive or mechanically coupled thereto by using a screw. Thus, the head limiter 250 absorbs part of the amount of impact so that the amount of impact applied to the surface of the magnetic disk 120 is lower. Accordingly, the possibility of the damage to the magnetic head due to the head slap is further lowered.

As is described above, according to the magnetic head parking system of a hard disk drive according to the embodiment of the present invention, since the head limiter is formed to protrude from the upper surface of the flange of the spindle motor, when an external impact is applied and the operation of the hard disk drive is stopped, the range of movement in the upward and downward directions of the magnetic head is limited by the head limiter. Therefore, the possibility of the damage to the magnetic head due to the head slap is lower.

Although an embodiment of the present invention has been shown and described, it would be appreciated by those skilled in the art that changes may be made in the embodiment without departing from the principles and spirit of the invention, the scope of which is defined in the claims and their equivalents.

What is claimed is:

1. A magnetic head parking system of a hard disk drive to move a magnetic head mounted on a slider of an actuator from a data zone of a disk and to place the magnetic head in a parking zone of the disk when the disk stops rotating, the hard disk drive including a spindle motor with a flange thereof to rotate the disk, the magnetic head parking system comprising:

a head limiter provided on an upper surface of the flange of the spindle motor to protrude toward the disk and restricting a range of movement in upward and downward directions of the magnetic head placed in the parking zone of the disk.

2. The system as claimed in claim 1, wherein the head limiter is provided at a position opposite to a position where the slider of the actuator is installed.

3. The system as claimed in claim 2, wherein the head limiter is provided at a position deviated from a position directly under the slider.

4. The system as claimed in claim 2, wherein:
the actuator comprises a suspension to support the slider thereon; and
the head limiter is formed larger in a width thereof than a width of the suspension.

5. The system as claimed in claim 2, wherein the actuator comprises:
a suspension to support the slider thereon, and
when the magnetic head lands on a surface of the disk, an interval between the head limiter and the suspension is in a range of about 0.3 mm to 0.6 mm.

6. The system as claimed in claim 1, wherein the head limiter comprises:
an upper curved surface.

7. The system as claimed in claim 1, wherein the head limiter is formed integrally with the flange.

8. The system as claimed in claim 7, further comprising:
a buffer member, wherein the head limiter comprises:
an upper curved surface attached to the buffer member.

9. The system as claimed in claim 1, wherein the head limiter installed on the upper surface of the flange comprises:
a material having a buffering ability.

10. A magnetic head parking system of a hard disk drive to move a magnetic head mounted on an actuator from a data zone to a parking zone of a disk when the disk mounted on a spindle motor stops rotating, with the actuator having a free end comprising the head and a secured end, comprising:

a head limiter protruding toward the disk from the spindle motor and restricting a range of movement, in directions toward and away from the spindle motor, of the magnetic head while located in the parking zone of the disk, wherein the head limiter is oriented between the secured end of the actuator and the head.

11. The system as claimed in claim 10, further comprising:
a slider coupled at opposite ends thereof to the magnetic head and to the actuator, respectively.

12. The system as claimed in claim 11, wherein the head limiter is provided at a position opposite to a position where the slider is disposed.

13. The system as claimed in claim 11, wherein the head limiter is provided at a position deviated from and/or adjacent to a position directly opposite the slider.

14. The system as claimed in claim 11, wherein the actuator comprises:
a suspension to support the slider thereon.

15. The system as claimed in claim 14, wherein the head limiter is disposed under the suspension at any position opposite to a position where the slider is disposed.

16. The system as claimed in claim 15, wherein the range of movement of the suspension is restricted in accordance with the position of the head limiter.

17. The system as claimed in claim 16, wherein the magnetic head located at the end portion of the suspension is limited within a predetermined range of movement.

18. The system as claimed in claim 14 wherein the head limiter is formed larger in a width thereof than a width of the suspension.

19. The system as claimed in claim 14, wherein an entire width of the suspension is contactable with the head limiter at a contact portion between the suspension and the head limiter.

20. The system as claimed in claim 11, wherein the actuator comprises:
a pivot shaft;
an arm pivotably coupled to the pivot shaft; and
a suspension installed at the arm to support the slider on which the magnetic head is mounted, the suspension being elastically biased toward a surface of the disk.

21. The system as claimed in claim 11, wherein, when the magnetic head lands on a surface of the disk, an interval between the head limiter and the suspension is in a range of about 0.3 mm to 0.6 mm.

22. The system as claimed in claim 10, wherein the head limiter comprises:
   an upper curved surface.

23. The system as claimed in claim 10, wherein the head limiter is formed integrally with the mounting surface.

24. The system as claimed in claim 23, further comprising:
   a buffer member having a predetermined thickness, wherein the head limiter comprises:
      an upper curved surface attached to the head limiter.

25. The system as claimed in claim 24, wherein the buffer member is made of rubber or synthetic resin having a buffering ability.

26. The system as claimed in claim 24, wherein the buffer member is attached to the upper surface of the head limiter by an adhesive or mechanically coupled thereto.

27. The system as claimed in claim 24, wherein the buffer member having a buffering ability is provided in a profile of a convex shape.

28. The system as claimed in claim 10, wherein the head limiter installed on the mounting surface comprises:
   a material having a buffering ability.

29. A system as claimed in claim 10, further comprising:
   a first stepped surface portion; and
   a second stepped surface portion, such that the first stepped surface portion is formed lower than a second stepped surface portion to prevent interference with the actuator when moving the actuator.

30. A magnetic head parking system of a hard disk drive to move a magnetic head mounted on an actuator from a data zone to a parking zone of a disk when the disk mounted on a spindle motor stops rotating, with the actuator having a free end comprising the head and a secured end, comprising:
   a head limiter protruding toward the disk from the spindle motor and restricting a range of movement to prevent a head slap of the magnetic head while located in the parking zone of the disk, wherein the head limiter is oriented between the secured end of the actuator and the head.

* * * * *